United States Patent [19]

Schaefer et al.

[11] Patent Number: 5,380,794
[45] Date of Patent: Jan. 10, 1995

[54] POLYVINYL BUTYRAL TACKIFIER FOR VINYL CHLORIDE POLYMER COMPOSITIONS

[75] Inventors: Richard E. Schaefer, Fairview Heights, Ill.; James T. Renshaw, St. Louis, Mo.; Peter M. Maino, Manhasset, N.Y.

[73] Assignee: Monsanto Company, St. Louis, Mo.

[21] Appl. No.: 144,379

[22] Filed: Nov. 2, 1993

[51] Int. Cl.⁶ .............. C08L 29/04; C08L 27/06; C08L 61/02
[52] U.S. Cl. .................... 525/57; 525/154; 525/160; 525/239; 524/423; 524/425; 524/451
[58] Field of Search .............. 525/57, 154, 160, 239; 524/423, 425, 451

[56] References Cited

U.S. PATENT DOCUMENTS

| | | | |
|---|---|---|---|
| 4,243,571 | 1/1981 | Gabbard | 260/31.8 |
| 4,368,341 | 1/1983 | Mathis et al. | 585/25 |
| 4,404,311 | 9/1983 | Mathis et al. | 524/486 |
| 5,221,708 | 6/1993 | Klaiber | 525/57 |
| 5,281,674 | 1/1994 | Klaiber et al. | 525/245 |

FOREIGN PATENT DOCUMENTS 1108810 9/1981 Canada.
0471658 2/1992 European Pat. Off..
0519151 12/1992 European Pat. Off..

Primary Examiner—James J. Seidleck
Assistant Examiner—W. Robinson H. Clark
Attorney, Agent, or Firm—Lawrence L. Limpus

[57] ABSTRACT

A vinyl composition tile formulation is disclosed which comprises polyvinyl chloride, inorganic fillers and from about 0.5% to about 4%, by weight of said formulation, polyvinyl butyral, as a tackifier.

14 Claims, No Drawings

POLYVINYL BUTYRAL TACKIFIER FOR VINYL CHLORIDE POLYMER COMPOSITIONS

BACKGROUND OF THE INVENTION

This invention relates to the use of polyvinyl butyral as a raw material component for the manufacture of resilient flooring material. More particularly, this invention relates to the use of polyvinyl butyral as a tackifying agent for use in the manufacture of vinyl composition tile. This invention also relates to resilient flooring compositions containing recovered polyvinyl butyral.

DESCRIPTION OF THE PRIOR ART

Synthetic flooring has gained widespread commercial acceptance and is made from various flooring compositions which may comprise all sorts of resins or mixtures of resins. Polyvinyl chloride and copolymers of polyvinyl chloride, which shall together be referred to as PVC herein, are widely used in flooring materials and PVC is a major component of many current synthetic flooring compositions. PVC can be utilized in various forms such as, for example, plasticized PVC and PVC foam.

PVC compositions or formulations used for resilient flooring materials are essentially filled or extended with other materials. The formulation usually contains a substantial amount of filler which is generally an inorganic material such as, for example, clay, talc, calcium carbonate, barium sulfate and other materials with which such formulations are commonly extended. The PVC may also contain minor amounts of conventional additives such as colorants, stabilizers, tackifiers and plasticizers. The PVC and the organic additives are a binder which holds the inorganic filler together.

After thorough mixing and heating the PVC composition, which includes PVC, fillers and appropriate additives, is formed into a sheet, such as vinyl floor tile, by passage of the composition through a calender where it is sheeted to the desired thickness. The still hot material is then passed through additional calender rollers for cooling before being cut into the desired tile sizes. Contact between the rollers and the hot material is necessary for proper processing of the material. Thus, tackifiers such as poly alpha methyl styrene, the industry standard, have been added to the PVC composition to provide a tackiness, or sticky property, to the surface of the PVC composition at elevated temperatures such as temperatures greater than 105° C. so that the composition will maintain its contact with the calender train during the processing and other handling. However, a proper tackifier loses its sticky properties when the temperature of the PVC composition is reduced.

SUMMARY OF THE INVENTION

This invention is directed to a new tackifier for use in the manufacture of vinyl composition tile. More particularly, this invention is directed to the use of polyvinyl butyral and preferably recovered or recycled polyvinyl butyral, which may contain plasticizers and other additives or contaminants, as a tackifying agent for use in the manufacture of PVC based vinyl composition tiles. This invention is also directed to resilient flooring or floor tiles containing recovered polyvinyl butyral.

This invention is specifically directed to vinyl chloride polymer compositions comprising PVC, inorganic fillers and polyvinyl butyral. Polyvinyl butyral is added to the composition in the range of from about 0.5% to about 4% by weight compared to the total weight of the composition, preferably in the range of from about 0.5% to about 2% by weight compared to the total weight of the composition, and more preferably in the range of from about 0.75% to about 1.25% by weight compared to the total weight of the composition, to serve as a tackifier. It has been found that the polyvinyl butyral tackifier provides superior performance when the tackifier content of the PVC composition is about 1.2% by weight compared to the total weight of the composition. Optionally, minor amounts of conventional additives such as colorants, stabilizers and plasticizers may also be added to the composition.

This invention is also directed to the use of polyvinyl butyral as a tackifier in compositions or formulations containing PVC. Specifically the invention is directed to the preferred use of recycled or recovered polyvinyl butyral.

DESCRIPTION OF THE PREFERRED EMBODIMENTS

While the use of various resinous materials has steadily increased in all areas of industry, environmental awareness and concern and regulations concerning the disposal of these materials have also greatly increased. Thus, the need for processes for the efficient and economically acceptable recovery, or recycle, of resinous materials has grown.

Plasticized polyvinyl butyral (PVB) is one of the resinous materials for which no appropriate large scale recycling has been available. Plasticized polyvinyl is used in large quantities primarily as an interlayer in laminated safety glass for windows in buildings and windshields in automobiles. The glass from these laminated safety glasses has been recovered by conventional techniques such as, for example, by crushing, grinding and milling the scrap laminated glass to release small glass particles from the polyvinyl butyral interlayer. While the glass has been recycled, the remaining polyvinyl butyral, which contains various additives, contaminants and glass particles, has been disposed of by conventional methods including incineration and placement in landfills.

Polyvinyl butyral is a complex resin which may be manufactured, depending upon the desired application, with large variations in respect to structural features and composition. Acetals, such as polyvinyl butyral, are formed by the well-known reaction between aldehydes and alcohols. The addition of one molecule of an alcohol to one molecule of an aldehyde produces a hemiacetal. Hemiacetals are rarely isolated, because of their inherent instability, but rather, are further reacted with another molecule of alcohol to form a stable acetal. Polyvinyl acetals are prepared from aldehydes and polyvinyl alcohols. Polyvinyl alcohols are high molecular weight resins containing various percentages of hydroxyl and acetate groups produced by hydrolysis of polyvinyl acetate. The conditions of the acetal reaction and the concentration of the particular aldehyde and polyvinyl alcohol used are closely controlled to form polymers containing predetermined proportions of hydroxyl groups, acetate groups and acetal groups.

Primarily the differences between different types of polyvinyl butyral relate to differences in molecular weight, differences in the content of hydroxyl, butyral and residual ester groups, differences in the type and content of the added plasticizer and differences in the type and content of other additives. A typical polyvinyl butyral resin may have a molecular weight range, according to the Staudinger equation, of from about 30,000 to about 600,000, a range of from about 12% to about 20% by weight of hydroxyl groups calculated as the polyvinyl alcohol, and a range of from 0% to about 3% by weight residual ester groups calculated as polyvinyl acetate.

Many different well known compounds may be used as plasticizers for polyvinyl butyral. Typical compounds are, for example, di-n-hexyl-adipate, butylbenzyl phthalate, 3-ethyleneglycol ethyl butyrate, dioctyl adipate and tetraethyleneglycol heptanoate. The amount of plasticizer used in a polyvinyl butyral composition will vary widely depending upon the desired use and is typically between about 5% and about 50% by weight of the polyvinyl butyral.

Synthetic flooring has gained widespread commercial acceptance and is made from various flooring compositions which may comprise all sorts of resins or mixtures of resins. PVC (polyvinyl chloride and copolymers of polyvinyl chloride) is widely used in flooring materials and it is a major component of many current synthetic flooring compositions. Plasticizers are included in the composition and, expressed as a percent by weight of the total PVC, the plasticizer content may be from about 5% to about 50%. Preferably the plasticizer content varies from about 15% to about 40% and most preferably it varies from about 20% to about 30%.

PVC compositions used for flooring materials are filled or extended with other materials and the PVC serves as a binder to hold the materials together. The PVC composition usually contains a substantial amount of filler and the total filler content, composed of one or more kinds of fillers, may be within the range of from about 65% to about 90% by weight, expressed as a percent of the weight of the total composition. Preferably the filler content varies from about 80% to about 85%. The fillers are well known in the art and are generally inorganic materials such as, for example, clay, talc, calcium carbonate, barium sulfate, silicates and aluminum trihydrate. The PVC may also contain conventional additives such as plasticizers, coloring agents, UV-stabilizers, antistatic agents, thermal stabilizers and flame retardants which are used for their established function in amounts that are known in the art.

During processing, it is necessary for the heated PVC compositions to remain in contact with the surface of the processing equipment. Thus, additional additives have been included in the formulations to serve as tackifiers, to provide a stickiness to maintain the contact between the composition and the equipment. Within the flooring industry, tackifiers are also referred to as processing aids. The additives selected for use as tackifiers must have a tackiness or stickiness while the composition is at an elevated temperature, at a temperature greater than 105° C. for example, while exhibiting no tackiness at normal, or even somewhat elevated, ambient temperatures. Poly alpha methyl styrene has been most often selected for use as the tackifier in PVC compositions although other synthetic resins and natural rosins have also been used.

The PVC compositions or formulations of this invention use polyvinyl butyral as the tackifier. The PVC composition usually contains a relatively minor amount of the tackifier material and the total tackifier content, composed of one or more types of polyvinyl butyral, is usually within the range of from about 0.5% to about 4% by weight, expressed as a percent of the weight of the total composition. Preferably the tackifier content is within the range of from about 0.5% to about 2% and more preferably within the range of from about 0.75% to about 1.25%. It has been found that the polyvinyl butyral tackifier provides superior performance when the tackifier content in the PVC composition is about 1.2% by weight based upon the total weight of the composition.

It has been found that the use of polyvinyl butyral as the tackifier in PVC formulations in accordance with this invention improves the heat and light stability of the resulting vinyl composition tile as the products currently in use as tackifiers are highly aromatic and, thus, are more prone to ultraviolet (UV) attack. Further, the use of the polyvinyl butyral tackifier improves the impact strength of the tiles that are produced and provides a tile which has a whiter appearance while providing tack properties that are equal to or better than the properties of the currently used materials.

The polyvinyl butyral used as the tackifier in PVC compositions in accordance with this invention may be virgin polyvinyl butyral, that is polyvinyl butyral which has not been used previously. However, it is preferred that the polyvinyl butyral be recovered or recycled polyvinyl butyral as the recycled polyvinyl butyral provides a lower cost but equally high quality raw material.

The kind of recovered polyvinyl butyral is not critical to the working of the invention. It has been found that recovered polyvinyl butyral of different kinds and from different manufacturing origins, as well as mixtures of different kinds of polyvinyl butyral, are suitable for use as tackifiers in accordance with this invention. The kind and amount of plasticizer in the recovered polyvinyl butyral is also not critical to the working of the invention. Recovered polyvinyl butyral which contains different kinds of plasticizers, mixtures of recovered polyvinyl butyral containing two or more different plasticizers and polyvinyl butyral which does not contain any plasticizer are all suitable for use as a tackifier in accordance with this invention. When the polyvinyl butyral used as a tackifier contains a plasticizer, it may be desired to reduce the amount of plasticizer added to the PVC. This can be determined experimentally according to known techniques such as by carrying out laboratory scale manufacturing under standard processing conditions or through measurements taken during the normal efforts to optimize the process.

PVC and the organic additives are the binder which holds the inorganic filler together. Polyvinyl butyral is added to the PVC, in accordance with this invention, to serve as the tackifier during processing of the PVC. Polyvinyl butyral, an organic additive to the PVC, is also a binder in addition to being the tackifier and lower amounts of PVC may be used in the formulation when polyvinyl butyral is added.

The recovered or recycled polyvinyl butyral can contain common contaminants such as sand and fine glass particles and still be acceptable for use as a tackifier. During the processing steps of the polyvinyl butyral recovery and the manufacturing of flooring material, these glass particles have generally become minute and act, as does the sand and other contaminants, as an additional filler in the PVC composition. Thus the glass, sand and other contaminants do not adversely affect, to any substantial extent, the use of the recovered polyvinyl butyral as a tackifier in PVC compositions and vinyl composition tile formulations. While the amount of these minute glass particles is relatively small, preferably less than about 2% by weight of the recycled polyvinyl butyral, larger quantities such as up to about 5% or even up to about 10% can be used. The amount of the other contaminants such as sand is generally low, usually less than about 5% by weight of the polyvinyl butyral, and it is preferred that the amount be less than about 2%.

The recovered polyvinyl butyral can contain various additives and contaminants such as, for example, plasticizers, glass particles, sand and other contaminants, and still be suitable for use as a tackifier in accordance with this invention. However, the recovered polyvinyl butyral must be substantially free of metal parts.

The PVC containing formulations of this invention, which include polyvinyl butyral as a tackifier, can be routinely processed on existing equipment for the manufacture of PVC flooring such as, for example, Banbury mixers or continuous mixers, calender trains, press molds and laminating equipment.

The compositions of this invention are suitable for use in the manufacture of flooring in monolayer form, as tiles for example, and can also be used as an element, as a wear layer for example, in multilayer floorings. The flooring materials can optionally be combined with other conventional flooring elements such as backing elements, adhesive layers and top wear layers.

The invention will be better understood by the following examples which illustrate, but do not limit, the preparation and effectiveness of this invention, the use of polyvinyl butyral, especially recycled polyvinyl butyral, as a tackifier in PVC formulations for resilient flooring or floor tile. All chemicals employed in the preparation of the compositions are listed in Table 1. All chemicals were used as obtained from suppliers.

TABLE 1

| MATERIALS AND SUPPLIERS | | |
| --- | --- | --- |
| Designation | Description | Supplier |
| VC-113 | PVC/PVC acetate copolymer | Borden Co. |
| A-1185 | Homopolymer of PVC | Air Prod. & Chem., Inc. |
| Oxy-185 | Homopolymer of PVC | Occidental Chemical Co. |
| Oxy-315 | PVC/PVC acetate copolymer | Occidental Chemical Co. |
| Oxy-390 | PVC/PVC acetate copolymer | Occidental Chemical Co. |
| A-18-210 | Alpha-methylstyrene | Ammoco Chemical Co. |
| A-18-240 | Alpha-methyl styrene | Ammoco Chemical Co. |
| Zecorez | Rosin | Ziegler Chem. & Mineral |
| Butvar ® | Polyvinyl butyral | Monsanto Co. |
| Saflex ® | Butvar with 32 PHR di-n-hexyl adipate | Monsanto Co. |
| S-160 | Santicizer 160 ® - Butylbenzyl phthalate | Monsanto Co. |
| Palatinol 711P ® | Dialkyl phthalate | BASF |
| S-965 | S-160 & Palatinol 711P (50/50) | Monsanto Co. |
| S-261 | Santicizer 261 ® Alkylbenzyl phthalate | Monsanto Co. |
| S-2044 | S-160 & DINP (60/40) | Monsanto Co. |
| Mark 4500 zinc stabilizer | Organo barium | Argus Chem. Div., Witco Chem. Corp. |
| T-2101 | Titanium dioxide | National Lead Co. |
| RJ-100 | Styrene allyl alcohol | Monsanto Co. |

TABLE 1-continued

| MATERIALS AND SUPPLIERS | | |
| --- | --- | --- |
| Designation | Description | Supplier |
| C-50 Limestone C | Limestone - CaCO$_3$ Coarse limestone | |
| Limestone F | Fine limestone | |

The following tests were performed on the resilient floor tile produced in the following examples:
McBurney—an indentation test performed in accordance with ASTM F142.
Impact—a falling ball impact test performed in accordance with ASTM F1265.
The following additional tests were performed:
Dimensional stability A tile was conditioned at ambient temperature for 12 hours, scribed with a trammel, and placed upon a polished plate that was dusted with talc. The plate and tile were placed into an oven and maintained at 82° C. for 6 hours. The tile was then cooled for at least 1 hour to ambient temperature and scribed again. The difference between the two scribe marks was measured. A 30 cm. tile passes the test if the difference is less than 0.063 cm.

Water growth or absorption

A tile was conditioned at ambient temperature for 12 hours, scribed with a trammel, and placed on a cheese cloth in a Pyrex dish containing about 4 cm. of water. The dish was covered to prevent loss of water and maintained at ambient temperature for 3 days. The tile was then removed from the water, blotted dry and scribed again. The difference between the two scribe marks was measured. A 30 cm. tile passes the test if the difference is less than 0.063 cm.

Heat stability

A tile was heated to 160° C. and the time required for the initial color change in the tile, in minutes, was measured.

Light stability

A tile was placed in a fade-o-meter and exposed to a xenon light source. The time required for the initial color change in the tile, in hours, was measured.

In addition to these tests, the tiles were measured and visually inspected for the following criteria:
1. Time to form the sheet in seconds
2. Tac to the mill
3. Visual rating or appearance of the tile
4. Hot strength of the tile
5. Edge rating
6. Tile thickness
7. Tile color

EXAMPLES 1–5

The formulations shown in Table 2 were prepared to compare the properties of resilient floor tile produced using alpha-methylstyrene and polyvinyl butyral, which was recovered from automobile windshield scrap (Saflex ® vinyl butyral), as a tackifier. In Examples 3 and 4 the recovered polyvinyl butyral was cut into small pieces for incorporation into the formulation and in Example 5 it was cut into large pieces. In Example 4 the polyvinyl butyral was washed to remove sodium carbonate and other contaminates. The formulations were mixed in a Hobart mixer for 5 minutes at low speed and then milled in a 6×12 two roll mill for 2 minutes at a temperature between about 130° C. and about 133° C. A 6×12 two roll mill is a mill having rollers approximately 15.25 cm. in diameter and a face width of approximately 30.5 cm. The formulation was sheeted through a nip set to produce a finished tile having a thickness of approximately 2.3 millimeters. In Table 2, the quantity of each material in the formulation is shown in parts by weight (pbw).

TABLE 2

| Example: | 1 | 2 | 3 | 4 | 5 |
| --- | --- | --- | --- | --- | --- |
| Formulation (pbw) | | | | | |
| Oxy-390 | 32 | 32 | 32 | 32 | 32 |
| Oxy-315 | 32 | 32 | 32 | 32 | 32 |
| Oxy-185 | 32 | 32 | 32 | 32 | 32 |
| A-18-210 | 10.5 | — | — | — | — |
| A-18-240 | — | 10.5 | — | — | — |
| Saflex ® | — | — | 10.5 | — | — |
| Saflex ® (washed) | — | — | — | 10.5 | — |
| Saflex ® (large) | — | — | — | — | 10.5 |
| Mark 4500 | 3.8 | 3.8 | 3.8 | 3.8 | 3.8 |
| S-261 | 32.7 | 32.7 | 32.7 | 32.7 | 32.7 |
| C-50 | 671.8 | 671.8 | 671.8 | 671.8 | 671.8 |
| T-2101 | 8.2 | 8.2 | 8.2 | 8.2 | 8.2 |
| Test Results | | | | | |
| Time to Form Sheet (sec.) | 40 | 45 | 45 | 45 | 45 |
| TAC to Mill | EX | EX | VG | Fair | Poor |
| Hot Strength | EX | EX | EX | VG | EX |
| Edge Rating | EX | EX | EX | VG | EX |
| Appearance | EX | EX | EX | Fair | Poor |
| Color | LtG | LtG | LtG | LtG | LtG |
| McBurney (23° C.) | 7.4 | 7.2 | 8.7 | 8.1 | No Test |
| Impact (25.4 cm. drop) | 6 | 7 | 14 | 12 | No Test |

EX = Excellent; VG = Very Good
LtG = Light Gray Color

EXAMPLES 6–8

The formulations shown in Table 3 were prepared to compare the properties of resilient floor tile produced using virgin polyvinyl butyral without a plasticizer, polyvinyl butyral containing plasticizer and a natural rosin as tackifiers. The formulations were mixed in a Hobart mixer for 5 minutes at low speed and then milled in a 6×12 two roll mill for 2 minutes with both rolls at a temperature between about 130° C. and about 133° C. The formulation was milled between rollers for a period of 1.25 minutes and, for the final 45 seconds, was folded or mixed through a nip set to produce a finished tile having a thickness of approximately 2.4 millimeters. In Table 3, the quantity of each material in the formulation is shown in parts by weight (pbw).

TABLE 3

| Example: | 6 | 7 | 8 |
| --- | --- | --- | --- |
| Formulation (pbw): | | | |
| VC-113 | 72 | 72 | 72 |
| A-1185 | 18 | 18 | 18 |
| S-965 | 28.2 | 28.2 | 28.2 |
| RJ-100 | 10.5 | 10.5 | 10.5 |
| Zecorez | 12.5 | — | — |
| Saflex ® | — | 12.5 | — |
| Butvar ® | — | — | 12.5 |
| Mark 4500 | 3.8 | 3.8 | 3.8 |
| Limestone C | 522.7 | 522.7 | 522.7 |
| Limestone F | 149.1 | 149.1 | 149.1 |
| T-2101 | 8.2 | 8.2 | 8.2 |
| Test Results | | | |
| TAC to Mill | Fair | Fair | Poor |
| Hot Strength | Poor | Excellent | Excellent |
| Edge Rating | Fair | Very Good | Good |
| Appearance | Very Good | Excellent | Excellent |
| McBurney (23° C.) | 6.9 | 7.7 | 5.9 |
| Impact (25.4 cm. drop) | 2 | 4 | 2 |

EXAMPLES 9–11

The formulations shown in Table 4 were prepared to compare the properties of resilient floor tile produced using polyvinyl butyral containing plasticizer, alpha-methylstyrene and styrene allyl alcohol as tackifiers. The formulations were mixed in a Hobart mixer for 5 minutes at low speed and then milled in a 6×12 two roll mill for 2 minutes with both rolls at a temperature of about 130° C. The formulation was milled between rollers for a period of 1.25 minutes and, for the final 45 seconds, was folded or mixed through a nip set to produce a finished tile having a thickness of approximately 2.35 millimeters. In Table 4, the quantity of each material in the formulation is shown in parts by weight (pbw).

TABLE 4

| Example: | 9 | 10 | 11 |
| --- | --- | --- | --- |
| Formulation (pbw): | | | |
| Oxy-390 | 37.1 | 37.1 | 37.1 |
| Oxy-315 | 37.1 | 37.1 | 37.1 |
| Oxy-185 | 37.1 | 37.1 | 37.1 |
| S-160 | 23.8 | 23.8 | 23.8 |
| S-711 | 15.8 | 15.8 | 15.8 |
| A-18-210 | 11.5 | — | — |
| RJ-100 | — | 11.5 | — |
| Saflex | — | — | 11.5 |
| Mark 4500 | 5 | 5 | 5 |
| C-50 | 647.2 | 647.2 | 647.2 |
| T-2101 | 8.2 | 8.2 | 8.2 |
| Test Results: | | | |
| Appearance | Excellent | Very Good | Excellent |
| TAC to Mill | Excellent | Good | Excellent |
| Hot Strength | Excellent | Good | Excellent |
| Edge Rating | Excellent | Good | Excellent |
| McBurney (23° C.) | 12.1 | 11.7 | 11.8 |
| Impact (25.4 cm. drop) | >25 | >25 | >25 |

EXAMPLES 12–14

The formulations shown in Table 5 were prepared to compare the properties of resilient floor tile produced using polyvinyl butyral containing plasticizer, alpha-methylstyrene and a natural rosin as tackifiers. The formulations were mixed in a Hobart mixer for 5 minutes at low speed and then milled in a 6×12 two roll mill for 2 minutes with both rolls at a temperature of about 134° C. The formulation was milled between rollers for a period of 1.25 minutes and, for the final 45 seconds, was folded or mixed through a nip set to produce a finished tile having a thickness of approximately 2.35 millimeters. In Table 5, the quantity of each material in the formulation is shown in parts by weight (pbw).

TABLE 5

| Example: | 12 | 13 | 14 |
| --- | --- | --- | --- |
| Formulation (pbw): | | | |
| Oxy-390 | 32 | 32 | 32 |
| Oxy-315 | 32 | 32 | 32 |
| Oxy-185 | 32 | 32 | 32 |
| S-2044 | 32.7 | 32.7 | 32.7 |
| A-18-240 | 10.5 | — | — |
| Zecorez | — | 10.5 | — |
| Saflex | — | — | 10.5 |
| Mark 4500 | 3.8 | 3.8 | 3.8 |
| C-50 | 671.8 | 671.8 | 671.8 |
| T-2101 | 8.2 | 8.2 | 8.2 |
| Test Results: | | | |
| Time to form sheet (sec.) | 40 | 42 | 40 |

TABLE 5-continued

| Example: | 12 | 13 | 14 |
|---|---|---|---|
| TAC to Mill | Excellent | Excellent | Excellent |
| Hot Strength | Excellent | Excellent | Excellent |
| Edge Rating | Excellent | Excellent | Excellent |
| Color | Light Gray | Light Gray | Light Beige |
| McBurney (23° C.) | 7.5 | 7.9 | 8.1 |
| Impact (25.4 cm. drop) | 8 | 18 | 7 |
| Dimension stability | pass | pass | pass |
| Water growth | pass | pass | pass |
| Heat stability (minutes) | 10–20 | 20–30 | <10 |
| Light stability (Hours) | 150 | >200 | <50 |

Polyvinyl butyral, especially recovered or recycled polyvinyl butyral which included a plasticizer, has been shown to be equal to or better than the tackifiers now used in vinyl composition tile formulations and the production of flooring materials. Further, the addition of the polyvinyl butyral maintained or improved the desired properties of the tile. Further, the polyvinyl butyral provided the desired tackifier properties required during the production of vinyl flooring materials or vinyl composition tile formulations based upon PVC and copolymers of PVC without significant degradation of the other important properties.

It will be apparent from the examples that many other variations and modifications may be made in the compositions and processes described without departing from the concept of the invention. Accordingly, it should be understood that the description and examples are illustrative only and are not intended to limit the scope of the invention.

I claim:

1. A vinyl chloride polymer composition comprising polyvinyl chloride, inorganic fillers and polyvinyl butyral, said polyvinyl butyral being from about 0.5% to about 4% by weight of said composition.

2. The vinyl chloride polymer composition of claim 1 wherein said polyvinyl butyral is from about 0.5% to about 2% by weight of said composition.

3. The vinyl chloride polymer composition of claim 2 wherein said polyvinyl butyral is from about 0.75% to about 1.25% by weight of said composition.

4. The vinyl chloride polymer composition of claim 1 wherein said inorganic fillers are from about 65% to about 90% by weight of said composition.

5. The vinyl chloride polymer composition of claim 4 wherein said inorganic fillers are from about 80% to about 85% by weight of said composition.

6. The vinyl chloride polymer composition of claim 1 wherein said inorganic fillers are selected from the group consisting of clay, talc, calcium carbonate and barium sulfate.

7. The vinyl chloride polymer composition of claim 1 wherein said polyvinyl butyral is recycled polyvinyl butyral.

8. A vinyl composition tile formulation comprising polyvinyl chloride, inorganic fillers and polyvinyl butyral, said polyvinyl butyral being from about 0.5% to about 4% by weight of said composition.

9. The vinyl composition tile formulation of claim 8 wherein said polyvinyl butyral is from about 0.5% to about 2% by weight of said composition.

10. The vinyl composition tile formulation of claim 9 wherein said polyvinyl butyral is from about 0.75% to about 1.25% by weight of said composition.

11. The vinyl composition tile formulation of claim 8 wherein said inorganic fillers are selected from the group consisting of clay, talc, calcium carbonate and barium sulfate.

12. The vinyl composition tile formulation of claim 8 wherein said polyvinyl butyral is recycled polyvinyl butyral.

13. A floor tile comprising polyvinyl chloride, from about 65% to about 90% by weight of Said tile of inorganic fillers and from about 0.5% to about 4% by weight of said tile of polyvinyl butyral.

14. The floor tile of claim 13 wherein said polyvinyl butyral is recycled polyvinyl butyral.

* * * * *